US012670444B2

(12) United States Patent (10) Patent No.: US 12,670,444 B2
Ko et al. (45) Date of Patent: Jun. 30, 2026

(54) METHOD AND APPARATUS FOR RE-TRAINING MODEL BY RECOGNIZING UNCERTAINTY IN ONLINE USER BEHAVIOR DETECTION

(71) Applicant: ELECTRONICS AND TELECOMMUNICATIONS RESEARCH INSTITUTE, Daejeon (KR)

(72) Inventors: Woo Ri Ko, Daejeon (KR); Jae Hong Kim, Daejeon (KR); Min Su Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 480 days.

(21) Appl. No.: 18/506,600

(22) Filed: Nov. 10, 2023

(65) Prior Publication Data

US 2025/0131327 A1 Apr. 24, 2025

(30) Foreign Application Priority Data

Oct. 19, 2023 (KR) ........................ 10-2023-0140465

(51) Int. Cl.
*G06N 20/00* (2019.01)
(52) U.S. Cl.
CPC .................................... *G06N 20/00* (2019.01)
(58) Field of Classification Search
CPC ...................................................... G06N 20/00
See application file for complete search history.

(56) References Cited

U.S. PATENT DOCUMENTS

| | | | |
|---|---|---|---|
| 10,726,313 B2 | 7/2020 | Lee et al. | |
| 2014/0372361 A1 | 12/2014 | Lee et al. | |
| 2020/0125390 A1 | 4/2020 | Kim et al. | |
| 2021/0241489 A1 | 8/2021 | Yang et al. | |

FOREIGN PATENT DOCUMENTS

| | | |
|---|---|---|
| KR | 101939683 B1 | 1/2019 |
| KR | 102174658 B1 | 11/2020 |

OTHER PUBLICATIONS

Hongji Guo, et al., "Uncertainty-Based Spatial-Temporal Attention for Online Action Detection", European Conference on Computer Vision (ECCV) (4), 2022, pp. 69-86.
Wenfei Yang, et al., Uncertainty Guided Collaborative Training For Weakly Supervised Temporal Action Detection, IEEE, 2021, p. 53-63.

*Primary Examiner* — Y Lee
(74) *Attorney, Agent, or Firm* — Rabin & Berdo, P.C.

(57) ABSTRACT

The present invention relates to a method and apparatus for re-training model by recognizing uncertainty in online user behavior detection. A method for training a model related to user behavior detection according to an embodiment of the present disclosure may comprise: detecting one or more behavior instances having a type of user behavior and a time interval of the user behavior; calculating at least one of a first uncertainty value for the type of user behavior or a second uncertainty value for the time interval of the user behavior; generating a first data newly labeling the type of user behavior or a second data newly labeling the time interval of the user behavior; and training a model that recognizes the user behavior information on a frame-by-frame basis.

20 Claims, 8 Drawing Sheets

FIG. 3

The figure shows element 130 (Frame-level User behavior recognizer) outputting "Frame-level Behavior recognition result $(c_t)$" and "Frame-level uncertainty $(u_t)$" into element 150 (Behavior classification uncertainty meter).

Behavior classification uncertainty meter

Inference timing ▶ t

| | $c_{s-2}$ | $c_{s-1}$ | $c_s$ | ... | $c_e$ | $c_{t=e+1}$ |
|---|---|---|---|---|---|---|
| Action $a_1$ | [0.01] | [0.01] | [0.7] | ... | [0.8] | [0.2] |
| Action $a_2$ | [0.15] | [0.55] | [0.65] | ... | [0.6] | [0.15] |
| ... | ... | ... | ... | ... | ... | ... |
| Action $a_n$ | [0.08] | [0.08] | [0.04] | ... | [0.01] | [0.02] |

| | $u_{s-2}$ | $u_{s-1}$ | $u_s$ | ... | $u_e$ | $u_{t=e+1}$ |
|---|---|---|---|---|---|---|
| Uncertainty | [0.05] | [0.05] | [0.25] | ... | [0.05] | [0.02] |

Behavior classification uncertainty $a_1$: $f(c_{s \leq t \leq e}, u_{s \leq t \leq e})$ Behavior classification uncertainty $a_2$: $f(c_{s-1 \leq t \leq e}, u_{s-1 \leq t \leq e})$

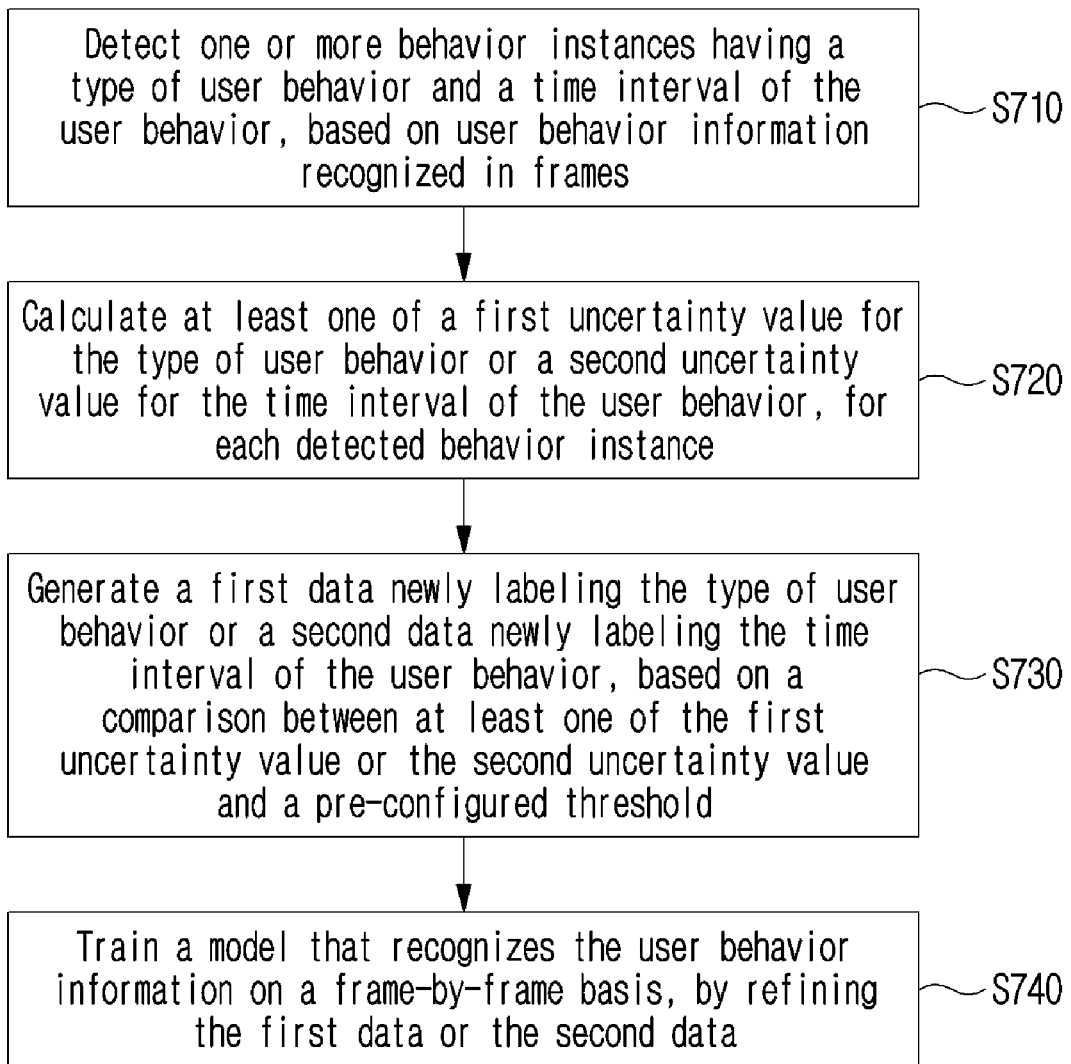

Detect one or more behavior instances having a type of user behavior and a time interval of the user behavior, based on user behavior information recognized in frames ~S710

Calculate at least one of a first uncertainty value for the type of user behavior or a second uncertainty value for the time interval of the user behavior, for each detected behavior instance ~S720

Generate a first data newly labeling the type of user behavior or a second data newly labeling the time interval of the user behavior, based on a comparison between at least one of the first uncertainty value or the second uncertainty value and a pre-configured threshold ~S730

Train a model that recognizes the user behavior information on a frame-by-frame basis, by refining the first data or the second data ~S740

METHOD AND APPARATUS FOR RE-TRAINING MODEL BY RECOGNIZING UNCERTAINTY IN ONLINE USER BEHAVIOR DETECTION

CROSS-REFERENCE TO RELATED APPLICATIONS

This application claims the benefit of earlier filing date and right of priority to Korean Application No. 10-2023-0140465, filed on Oct. 19, 2023, the contents of which are all hereby incorporated by reference herein in their entirety.

TECHNICAL FIELD

The present disclosure relates to technology for detecting user behaviors in online from images detected and collected by robots and/or surveillance cameras.

BACKGROUND

Various methods are being considered to collect additional labeled data for new environments or users and retrain the model.

For example, the entire process may be performed by a professional. Experts may periodically collect and label data, retrain the model, and deploy it. However, in the case of this method, large costs may be incurred as the entire process is performed by experts, and it may take a long time for the retrained model to be distributed back to users. Additionally, there is a problem that differences in model performance and quality may occur depending on the person in charge.

As another example, the user is periodically requested to label data, and retraining of the model may be performed on its own. However, in this method, users may feel fatigued due to frequent requests. As a result, problems with reduced performance may occur. Additionally, a separate interface needs to be designed for user data labeling, and there is a problem that may result in costs.

As another example, data labeling may be performed through crowd sourcing, and retraining of the model may be performed on its own. However, in the case of this method, since data labeling is performed by an unspecified number of people, it may be difficult to secure data and models optimized for the user environment. Additionally, data security issues may occur because user information must be transmitted externally.

SUMMARY

The technical object of the present disclosure is to provide a method and apparatus for recognizing uncertainty in real-time user behavior detection and performing retraining of the model.

The technical object of the present disclosure is to provide a method and apparatus for retraining a model by additionally collecting labeled data in order to successfully perform real-time user behavior detection in a new environment.

The technical objects to be achieved by the present disclosure are not limited to the above-described technical objects, and other technical objects which are not described herein will be clearly understood by those skilled in the pertinent art from the following description.

A method for training a model related to user behavior detection according to an aspect of the present disclosure may comprise: detecting one or more behavior instances having a type of user behavior and a time interval of the user behavior, based on user behavior information recognized in frames; calculating at least one of a first uncertainty value for the type of user behavior or a second uncertainty value for the time interval of the user behavior, for each detected behavior instance; generating a first data newly labeling the type of user behavior or a second data newly labeling the time interval of the user behavior, based on a comparison between at least one of the first uncertainty value or the second uncertainty value and a pre-configured threshold; and training a model that recognizes the user behavior information on a frame-by-frame basis, by refining the first data or the second data.

An apparatus for training a model related to user behavior detection according to an additional aspect of the present disclosure may comprise a processor and a memory, and the processor may be configured to: detect one or more behavior instances having a type of user behavior and a time interval of the user behavior, based on user behavior information recognized in frames; calculate at least one of a first uncertainty value for the type of user behavior or a second uncertainty value for the time interval of the user behavior, for each detected behavior instance; generate a first data newly labeling the type of user behavior or a second data newly labeling the time interval of the user behavior, based on a comparison between at least one of the first uncertainty value or the second uncertainty value and a pre-configured threshold; and train a model that recognizes the user behavior information on a frame-by-frame basis, by refining the first data or the second data.

As one or more non-transitory computer readable medium storing one or more instructions, the one or more instructions are executed by one or more processors and control an apparatus for training a model related to user behavior detection according to an additional aspect of the present disclosure to: detect one or more behavior instances having a type of user behavior and a time interval of the user behavior, based on user behavior information recognized in frames; calculate at least one of a first uncertainty value for the type of user behavior or a second uncertainty value for the time interval of the user behavior, for each detected behavior instance; generate a first data newly labeling the type of user behavior or a second data newly labeling the time interval of the user behavior, based on a comparison between at least one of the first uncertainty value or the second uncertainty value and a pre-configured threshold; and train a model that recognizes the user behavior information on a frame-by-frame basis, by refining the first data or the second data.

In various aspects of the present disclosure, the first data may be generated and refined when the first uncertainty value is greater than a first threshold value pre-configured for the type of user behavior.

Additionally, in various aspects of the present disclosure, the second uncertainty value may be calculated when the first uncertainty value is smaller than or equal to the first threshold value pre-configured for the type of user behavior.

Additionally, in various aspects of the present disclosure, the second data may be generated and refined when the calculated second uncertainty value is greater than a second threshold value pre-configured for the time interval of the user behavior.

Additionally, in various aspects of the present disclosure, the method may further comprise: generating a third data newly labeled using information on a behavior instance, when the first uncertainty value is less than or equal to the first pre-configured threshold value and the second uncertainty value is less than or equal to the second pre-configured threshold value; and training a model that extracts vector-type image features from real-time images, by refining the third data.

Additionally, in various aspects of the present disclosure, output information of the model that extracts the image features may be configured to be input to the model that recognizes the user behavior information on a frame-by-frame basis.

Additionally, in various aspects of the present disclosure, only one of the weights of a model that extracts the image features and the weights of a model that recognizes the user behavior information on a frame-by-frame basis may be trained, and the other one may be set to freeze.

Additionally, in various aspects of the present disclosure, a refinement of the first data may be performed based on a ratio of the interval in which the first uncertainty value is greater than a certain value in an interval in which a situation that interferes with recognition of user behavior occurs, and a refinement of the second data may be performed based on a ratio of the interval in which the second uncertainty value is greater than a certain value in an interval in which a situation that interferes with recognition of user behavior occurs.

Additionally, in various aspects of the present disclosure, the one or more behavior instances may be detected when the user behavior information remains greater than or equal to a threshold for the same behavior.

According to the present disclosure, a method and apparatus may be provided for recognizing uncertainty in real-time user behavior detection and performing retraining of a model.

According to the present disclosure, in order to successfully perform real-time user behavior detection in a new environment, a method and apparatus for retraining a model by additionally collecting labeled data may be provided.

According to the present disclosure, there is a technical effect that may quickly secure a learning model optimized for a new environment and user at a low cost, be possible to and continuous performance improvement without user and/ or expert intervention, and prevent data security issues and privacy infringement issues.

According to the present disclosure, since the proposed method is applicable not only to user behavior detection technology, but also to various technologies using data-based learning methods, there is a technical effect that may contribute to the spread of application of artificial intelligence technology.

Effects achievable by the present disclosure are not limited to the above-described effects, and other effects which are not described herein may be clearly understood by those skilled in the pertinent art from the following description.

BRIEF DESCRIPTION OF THE DRAWINGS

FIG. 3 illustrates the operation of the behavior classification uncertainty meter according to an embodiment of the present disclosure.

FIG. 6 illustrates a process of refining data for a problem situation interval according to an embodiment of the present disclosure.

FIG. 7 illustrates an operational flowchart for a method of performing model retraining according to an embodiment of the present disclosure.

DETAILED DESCRIPTION

Figure 1:
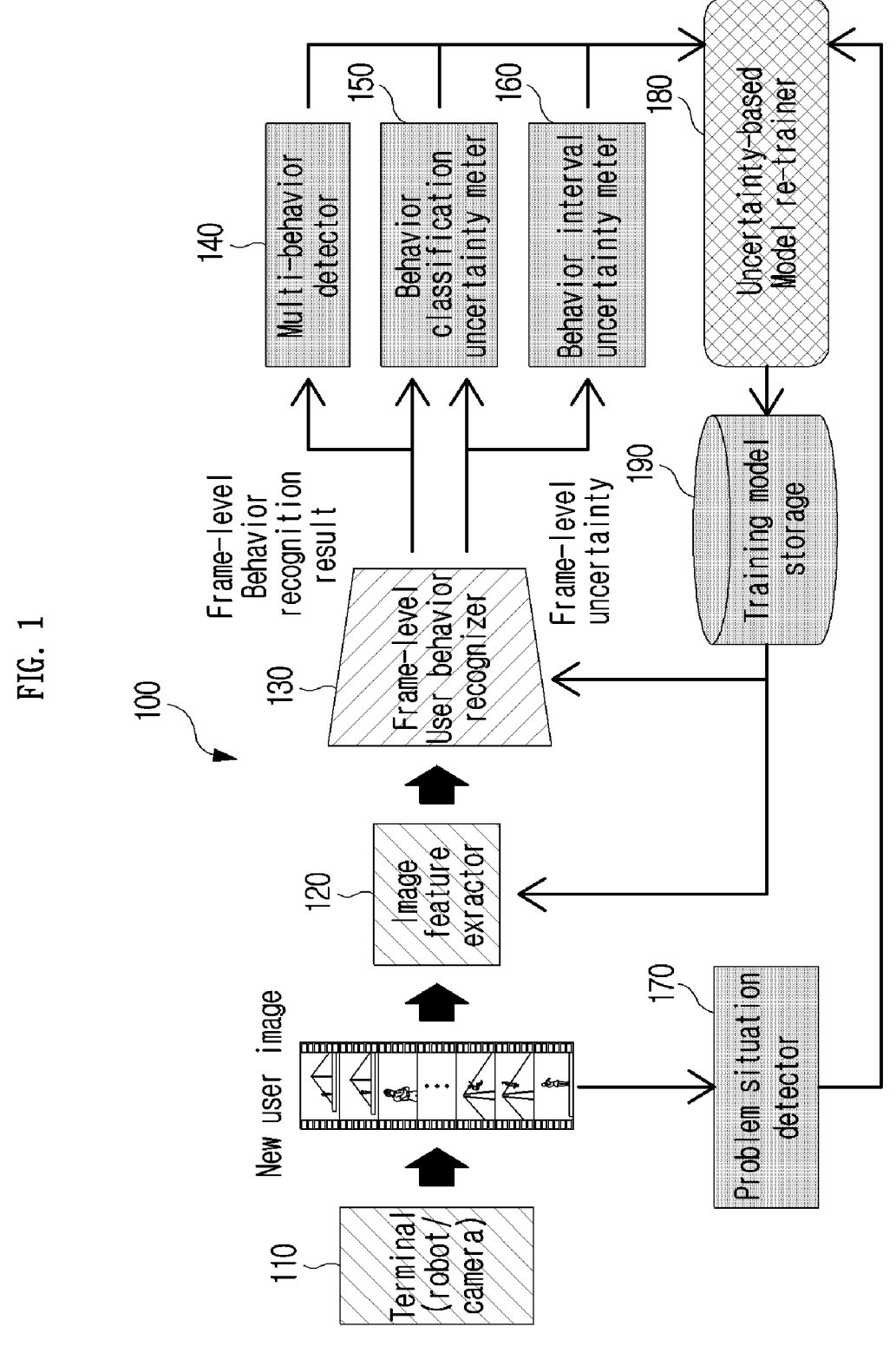
FIG. 1 illustrates a block diagram of an apparatus for re-training model by recognizing uncertainty in detection of a user behavior according to an embodiment of the present disclosure.

As the present disclosure may make various changes and have multiple embodiments, specific embodiments are illustrated in a drawing and are described in detail in a detailed description. But, it is not to limit the present disclosure to a specific embodiment, and should be understood as including all changes, equivalents and substitutes included in an idea and a technical scope of the present disclosure. A similar reference numeral in a drawing refers to a like or similar function across multiple aspects. A shape and a size, etc. of elements in a drawing may be exaggerated for a clearer description. A detailed description on exemplary embodiments described below refers to an accompanying drawing which shows a specific embodiment as an example. These embodiments are described in detail so that those skilled in the pertinent art can implement an embodiment. It should be understood that a variety of embodiments are different each other, but they do not need to be mutually exclusive. For example, a specific shape, structure and characteristic described herein may be implemented in other embodiment without departing from a scope and a spirit of the present disclosure in connection with an embodiment. In addition, it should be understood that a position or an arrangement of an individual element in each disclosed embodiment may be changed without departing from a scope and a spirit of an embodiment. Accordingly, a detailed description described below is not taken as a limited meaning and a scope of exemplary embodiments, if properly described, are limited only by an accompanying claim along with any scope equivalent to that claimed by those claims.

In the present disclosure, a term such as first, second, etc. may be used to describe a variety of elements, but the elements should not be limited by the terms. The terms are used only to distinguish one element from other element. For example, without getting out of a scope of a right of the present disclosure, a first element may be referred to as a second element and likewise, a second element may be also referred to as a first element. A term of and/or includes a combination of a plurality of relevant described items or any item of a plurality of relevant described items.

When an element in the present disclosure is referred to as being "connected" or "linked" to another element, it should be understood that it may be directly connected or linked to that another element, but there may be another element between them. Meanwhile, when an element is referred to as being "directly connected" or "directly linked" to another element, it should be understood that there is no another element between them.

As construction units shown in an embodiment of the present disclosure are independently shown to represent different characteristic functions, it does not mean that each construction unit is composed in a construction unit of separate hardware or one software. In other words, as each construction unit is included by being enumerated as each construction unit for convenience of a description, at least two construction units of each construction unit may be combined to form one construction unit or one construction unit may be divided into a plurality of construction units to perform a function, and an integrated embodiment and a separate embodiment of each construction unit are also included in a scope of a right of the present disclosure unless they are beyond the essence of the present disclosure.

A term used in the present disclosure is just used to describe a specific embodiment, and is not intended to limit the present disclosure. A singular expression, unless the context clearly indicates otherwise, includes a plural expression. In the present disclosure, it should be understood that a term such as "include" or "have", etc. is just intended to designate the presence of a feature, a number, a step, an operation, an element, a part or a combination thereof described in the present specification, and it does not exclude in advance a possibility of presence or addition of one or more other features, numbers, steps, operations, elements, parts or their combinations. In other words, a description of "including" a specific configuration in the present disclosure does not exclude a configuration other than a corresponding configuration, and it means that an additional configuration may be included in a scope of a technical idea of the present disclosure or an embodiment of the present disclosure.

Some elements of the present disclosure are not a necessary element which performs an essential function in the present disclosure and may be an optional element for just improving performance. The present disclosure may be implemented by including only a construction unit which is necessary to implement essence of the present disclosure except for an element used just for performance improvement, and a structure including only a necessary element except for an optional element used just for performance improvement is also included in a scope of a right of the present disclosure.

Hereinafter, an embodiment of the present disclosure is described in detail by referring to a drawing. In describing an embodiment of the present specification, when it is determined that a detailed description on a relevant disclosed configuration or function may obscure a gist of the present specification, such a detailed description is omitted, and the same reference numeral is used for the same element in a drawing and an overlapping description on the same element is omitted.

To recover from performance degradation that occurs when deploying user behavior detection technology to new users and/or environments, there is a need to collect additional labeled data and retrain the model based on it.

The present disclosure proposes a method of additionally collecting high-quality labeled data without a separate request from users and/or experts and retraining a model based on this.

That is, in the present disclosure, a method is proposed in which terminals/devices such as robots, cameras, etc. retrain the model by additionally collecting labeled data to successfully perform real-time user behavior detection in a new environment.

Specifically, in order to solve the above-mentioned problem, in the case of the proposed method of the present disclosure, the model collects high-quality labeled data for a new environment by making its own judgment and adjusting the behavior classification and interval based on uncertainty about the detection result. Additionally, the data to be used for retraining the model may be refined by detecting problem situations and occurrence intervals that may cause difficulty in user recognition.

Hereinafter, in this disclosure, a method and apparatus for recognizing uncertainty in real-time user behavior detection and performing model re-merging based on this will be described/proposed through specific examples.

FIG. 1 illustrates a block diagram of an apparatus for re-training model by recognizing uncertainty in detection of a user behavior according to an embodiment of the present disclosure.

Referring to FIG. 1, the device 100 for re-training model by recognizing uncertainty of user row detection may be composed of a terminal 110, an image feature extractor 120, a frame-level user behavior recognizer 130, a multi-behavior detector 140, a behavior classification uncertainty meter 150, a behavior interval uncertainty meter 160, a problem situation detector 170, an uncertainty-based model retrainer 180, a training model storage 190, etc.

The terminal 110 may correspond to a device such as a robot or surveillance camera for observing user behavior.

The terminal 110 may perform the role/function of transmitting the user's new image to the image feature extractor 120 in real time.

The image feature extractor 120 may perform the role/function of receiving a short interval of real-time video and extracting video features in vector format.

For example, to extract image features, a pre-trained neural network such as temporal segment networks (TSN) may be used. The output image feature vector may be transmitted to the frame-level user behavior recognizer 130.

The frame-level user behavior recognizer 130 may perform the role/function of simultaneously inferring/calculating the user behavior recognition result for a short video input at the current time and the uncertainty about the recognition result. In other words, the uncertainty may correspond to uncertainty per frame, that is, at each timing.

The user behavior recognition result may correspond to a probability value for whether the user is currently performing each predefined behavior at the current time. As an example, user action recognition results may be calculated using a pre-trained neural network (e.g., CAG-QIL, Simon, etc.).

The uncertainty value may correspond to a value (e.g., a single real number) indicating information about how low the reliability of the user behavior recognition result values is. As an example, the uncertainty value may be calculated through a predefined uncertainty estimation method (e.g., MC dropout, DDU, etc.).

The multi-behavior detector 140 may perform the role/function of detecting the user's behavior(s) that occurred within a certain period of time, the start time and end time of each behavior, etc.

That is, the multi-behavior detector 140 may find behavior instance(s) including the recognized behavior and interval information of the corresponding behavior. As an example, a method such as SimOn may be used to detect behavior instances.

To this end, the frame-level user behavior recognition result, which is the output result of the frame-level user behavior recognizer 130, may be configured to be stored for a certain period of time. The stored information may be used for multiple behavior detection. The saved frame-level user behavior recognition results may be configured to be deleted after a certain period of time for memory management.

The behavior classification uncertainty meter 150 may perform the role/function of inferring/calculating uncertainty about the behavior type of each behavior instance detected by the multi-behavior detector 130.

That is, a value (e.g., a single real number) representing information about how low the reliability of the type of recognized behavior is may be output.

To this end, the frame-level user behavior recognition result, which is the output result of the frame-level user behavior recognizer 130, and information on the uncertainty value may be configured to be stored for a certain period of time. The stored information may be used to measure behavior classification uncertainty. Information about stored frame-level user action recognition results and uncertainty values may be configured to be deleted after a certain period of time for memory management.

The behavior interval uncertainty meter 160 may perform the role/function of inferring/calculating uncertainty about the behavior interval detection result of each behavior instance detected by the multi-behavior detector 130.

In other words, a value (e.g., a single real number) representing information about how low the reliability of the start time and end time of the recognized behavior may be output.

To this end, the frame-level user behavior recognition result, which is the output result of the frame-level user behavior recognizer 130, and information on the uncertainty value may be configured to be stored for a certain period of time. The stored information may be used to measure behavior interval uncertainty. Information about stored frame-level user behavior recognition results and uncertainty values may be configured to be deleted after a certain period of time for memory management.

The problem situation detector 170 may perform the role/function of detecting whether a situation that may cause recognition difficulties exists in the user image captured by the terminal 110.

As an example, the problem situation detector 170 may detect whether changes in occlusion, shadow, camera noise, or lighting exist.

Information on the detected results and intervals may be transmitted to the uncertainty-based model retrainer 180.

The uncertainty-based model retrainer 180 may perform a role/function of automatically re-labeling the behavior classification and behavior interval for behavior instances in which behavior classification uncertainty and/or behavior interval uncertainty are greater than a threshold value.

The behavior classification is relabeled based on the behavior recognition results of the training model(s) stored in the training model storage 190, behavior intervals may be relabeled based on uncertainty values near the start timing and end timing.

The newly labeled data(s) may be refined based on frame-level uncertainty for the problem situation interval detected by the problem situation detector 170, thereafter, it may be used to retrain the image feature extractor 120 and/or the frame-level user behavior recognizer 130.

The training model storage 190 may perform the role/function of temporarily storing (e.g., backup, etc.) the models of the image feature extractor 120 and the frame-level user behavior recognizer 130 retrained by the uncertainty-based model retrainer 180.

In this regard, if the number of stored models exceeds a certain number, the oldest models may be deleted first for memory management.

Hereinafter, the operation method of the multi-behavior detector 140 will be described through specific examples.

The multi-behavior detector 140 continuously stores the behavior recognition results $c_t$ input in real time from the frame-level user behavior recognizer 130, and may start/ initiate multi-behavior detection from the point when a certain number of behavior recognition results are stored.

The behavior recognition result has values according to the number of predefined behaviors, and each value may represent the probability that the corresponding behavior occurred.

In relation to multi-behavior detection, when the behavior recognition result value maintains a value above the threshold for the same behavior, the corresponding interval may be detected as a behavior instance.

Figure 2:
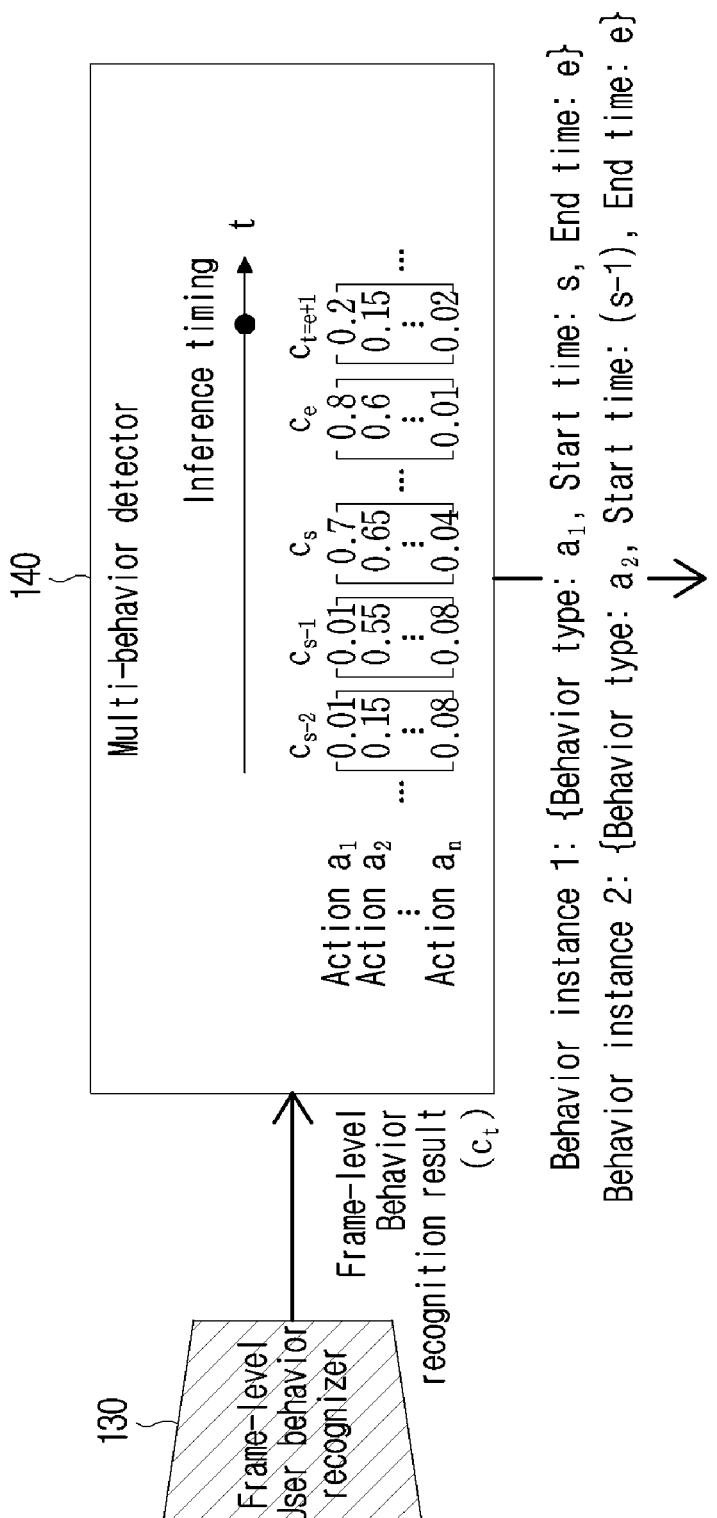
FIG. 2 illustrates the operation of a multi-behavior detector according to an embodiment of the present disclosure.

FIG. 2 illustrates the operation of a multi-behavior detector according to an embodiment of the present disclosure.

Referring to FIG. 2, when the threshold associated with the behavior recognition result is set to 0.5, action $a_1$ exceeds the threshold from time s to time e, and action $a_2$ exceeds the threshold from time s−1 to time.

Accordingly, the behavior instances detected at the current time t may be the first behavior instance {$a_1$, s, e} and the second behavior instance {$a_2$, s−1, e}.

Hereinafter, the operation method of the behavior classification uncertainty meter 150 will be described through specific examples.

When an instance is detected by the multi-behavior detector 140, the behavior classification uncertainty meter 150 may calculate/infer the behavior classification uncertainty for the corresponding behavior instance.

In this regard, behavior classification uncertainty may be calculated as a function of the behavior recognition result $c_t$ entered within the interval of the behavior instance and the uncertainty $u_t$ information on the behavior recognition result.

FIG. 3 illustrates the operation of the behavior classification uncertainty meter according to an embodiment of the present disclosure.

Referring to FIG. 3, since the interval of behavior instance $a_1$ is {s, e}, the behavior classification uncertainty may be calculated as $f(c_{s \leq t \leq e}, u_{s \leq t \leq e})$. Since the interval of behavior instance $a_2$ is {s−1, e}, the behavior classification uncertainty may be calculated as $f(c_{s-1 \leq t \leq e}, u_{s-1 \leq t \leq e})$.

In this regard, the function for calculating the behavior classification uncertainty of a behavior instance may be as shown in Equation 1.

$$f(c_{s \leq t \leq e}, u_{s \leq t \leq e}) = \alpha \sum_{t=s}^{e} \frac{u_t}{|c_t - \sigma_{th}| \cdot (\text{Var}(c_t - \sigma_{th}) + \theta)} \qquad \text{[Equation 1]}$$

In Equation 1, $\sigma_{th}$ represents the threshold value for determining the behavior manifestation in the multi-behavior detector 140, Var(x) represents the variance of the elements of the vector x, α represents the weight parameter with a positive value, and θ indicates an adjustment parameter with a value close to 0.

For example, the larger the difference between the behavior recognition result values within the behavior instance interval threshold value for determining behavior occurrence in the multi-behavior detector 140, the lower the overall behavior classification uncertainty may be. This is because the large difference means that the result of behavior classification is certain.

Additionally, the larger the frame-level uncertainty(s) within the behavior instance section, the higher the overall uncertainty may be.

Hereinafter, the operation method of the behavior interval uncertainty meter 160 will be described through detailed examples.

When a behavior instance is detected by the multi-behavior detector 140, the behavior interval uncertainty meter 160 can calculate/infer the action section uncertainty for the corresponding behavior instance.

The behavior section uncertainty may be calculated as a function of the uncertainty $u_t$ information about the behavior recognition result input before/after the start and end times of the behavior instance.

Figure 4:
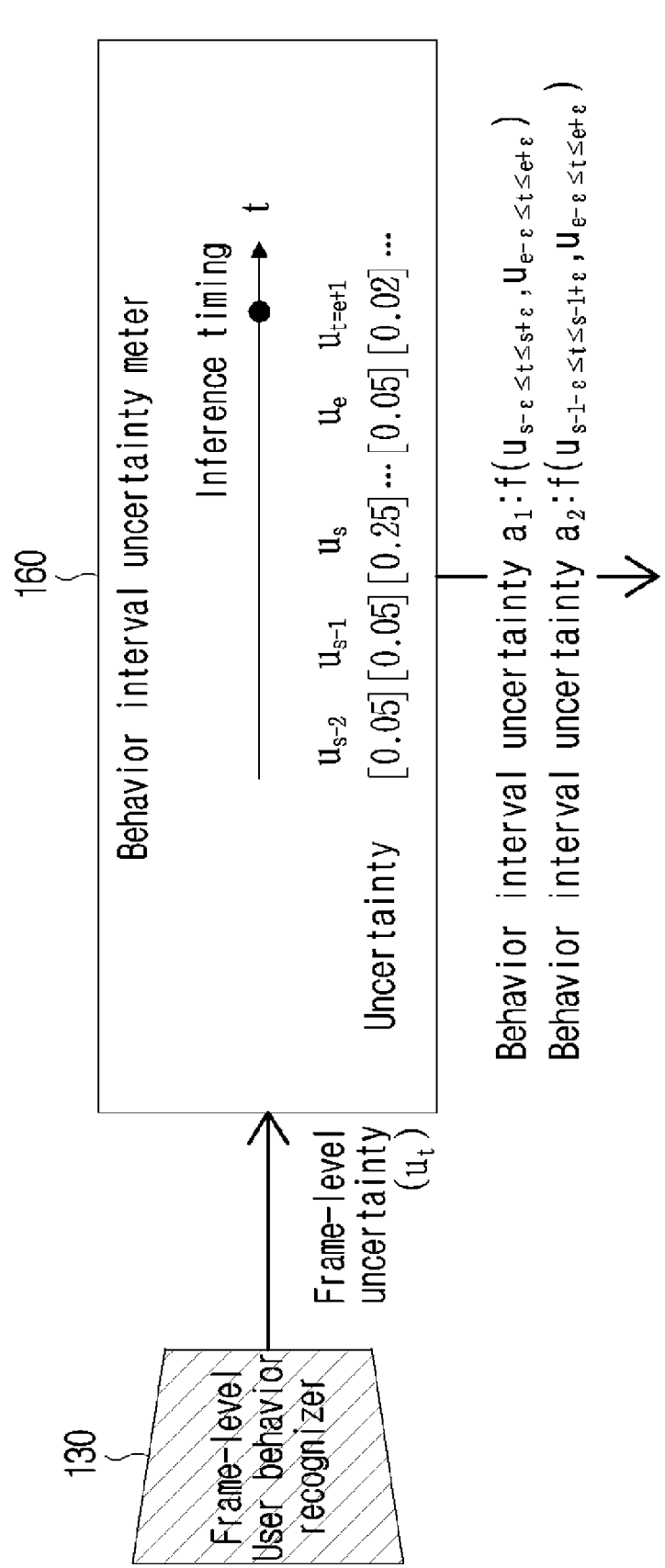
FIG. 4 illustrates the operation of the behavior interval uncertainty meter according to an embodiment of the present disclosure.

FIG. 4 illustrates the operation of the action interval uncertainty meter according to an embodiment of the present disclosure.

Referring to FIG. 4, the start time and end time of $a_1$ behavior instance are s and e, respectively, so the behavior interval uncertainty may be calculated as $f(u_{s-\varepsilon \le t \le s+\varepsilon}, u_{e-\varepsilon \le t \le e+\varepsilon})$. Since the start time and end time of $a_2$ behavior instance are s−1 and e, respectively, the behavior interval uncertainty may be calculated as $f(u_{s-1-\varepsilon \le t \le s-1+\varepsilon}, u_{e-\varepsilon \le t \le e+\varepsilon})$. At this time, $\varepsilon$ represents the number of uncertainty values to be used before/after the start time and end time, and may correspond to a positive integer.

The function for calculating the behavior interval uncertainty of a behavior instance may be as shown in Equation 2.

$$f(u_{s-\varepsilon \le t \le s+\varepsilon}, u_{e-\varepsilon \le t \le e+\varepsilon}) = \beta_1 \sum_{t_1=s-\varepsilon}^{s+\varepsilon} u_{t_1} + \beta_2 \sum_{t_2=e-\varepsilon}^{e+\varepsilon} u_{t_2} \qquad \text{[Equation 2]}$$

In Equation 2, $\beta_1$ and $\beta_2$ may represent weight parameters with positive values.

The larger the frame-level uncertainty value input before/after the start time and end time of a behavior instance, the higher the uncertainty of the entire behavior interval may be.

Hereinafter, the operation method of the problem situation detector 170 will be described through detailed examples.

Table 1 illustrates problem situations that may cause difficulty in user recognition by the problem situation detector 170.

TABLE 1

| Problem situation type | Detailed situation | Description |
| --- | --- | --- |
| Occlusion | Self Occlusion | A case that the user's body obscures the user |
| | Inter Object Occlusion | A case that the other user obscures the current user |
| | Background Occlusion | A case that the surrounding environment, such as a door, obscures the user |
| Shadow | Object Shadow | A case that there is a shadow from an object such as a ceiling decoration |
| | Background Shadow | A case that it is obscured by the surrounding environment such as a door or wall |
| Camera noise | Camera Noise | A case that noise occurs in the camera itself |
| Change in lighting | Change in Lighting | A case that there is a sudden change in lighting |

Referring to Table 1, examples of situations that may cause problems with user recognition include: Occlusion, shadow, camera noise, change in lighting, etc. may be considered.

Regarding the proposed method in this disclosure, the problem situations in Table 1 are examples, and the proposed method may be extended and applied even when other problem situations occur.

Hereinafter, the model retraining process in the uncertainty-based model retrainer 180 will be described through detailed examples.

Figure 5:
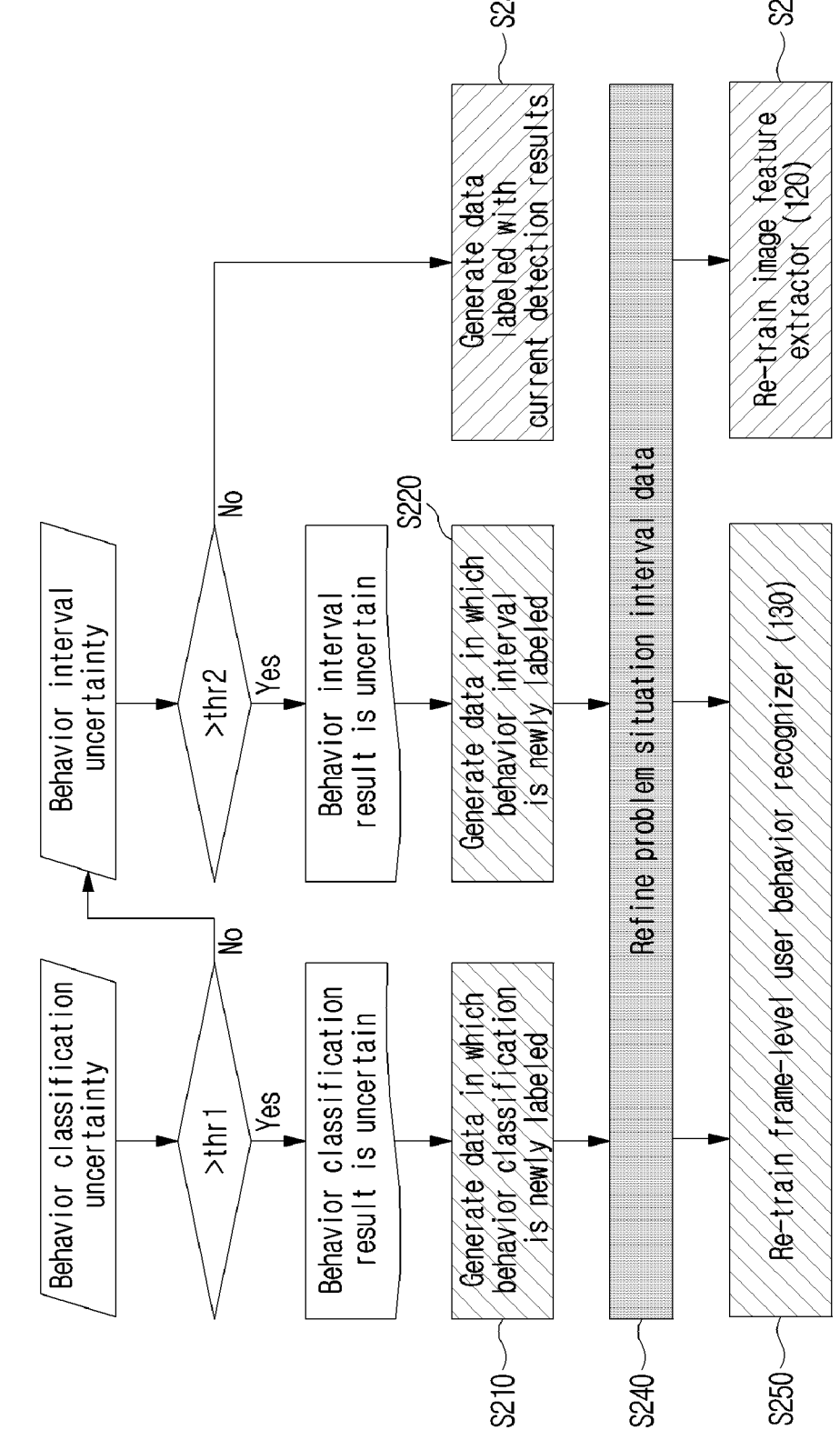
FIG. 5 illustrates a model retraining process according to an embodiment of the present disclosure.

FIG. 5 illustrates a model retraining process according to an embodiment of the present disclosure.

Referring to FIG. 5, the procedure described below may be performed for each behavior instance detected by the multi-behavior detector 140.

The uncertainty-based model retrainer 180 may operate by receiving as input the output of the multi-behavior detector 140, the output of the behavior classification uncertainty meter 150, and the output of the behavior interval uncertainty meter 160.

As described above, by checking the behavior classification uncertainty value measured by the behavior classification uncertainty meter 150, the uncertainty-based model retrainer 180 may check whether the corresponding uncertainty value is greater than a pre-configured first threshold value (e.g., thr1) or not.

If the corresponding uncertainty value is greater than the first pre-configured threshold value, the uncertainty-based model retrainer 180 may determine t that the behavior classification result is uncertain and generate data with a new behavior classification label (S210).

For example, the uncertainty-based model retrainer 180 may change the behavior type information of the behavior instance detected by the multi-behavior detector 140 to generate newly labeled data.

In general, as training and/or re-training progresses, the uncertainty value for mislabeled data may increase. Considering this, the uncertainty-based model retrainer 180 may find model j with the smallest uncertainty value for the data among m models stored according to the previous training state.

Thereafter, the uncertainty-based model retrainer 180 may change the behavior type of the behavior instance to the $I^{th}$ bahavior $a_1$, which has the largest number of larger values among the behavior recognition results ($c_{tj}$) of model j.

When the detected behavior instance is $\{a_d, s_d, e_d\}$, the changed behavior recognition result $\bar{c}_t$ may be defined as Equation 3 below.

$$\bar{c}_t = \begin{bmatrix} \bar{c}_{t1} \\ \bar{c}_{t2} \\ \vdots \\ \bar{c}_{tn} \end{bmatrix}, \quad \text{for } s_d \le t \le e_d, \qquad \text{[Equation 3]}$$

$$\bar{c}_{ti} = \begin{cases} 1 & \text{if } i = I \\ c_{ti} & \text{else} \end{cases},$$

$$I = \underset{i \in \{1,2,\dots,n\}}{\arg\max} \sum_{t=s_d}^{e_d} [c_{tij} \ge \sigma_{th}],$$

$$J = \underset{j \in \{1,2,\dots,m\}}{\arg\max} \sum_{t=s_d}^{e_d} u_{tj},$$

In Equation 3, $c_{tiJ}$ represents the value corresponding to the $i^{th}$ behavior at timing t among the behavior recognition results of model J. [•] means Iverson bracket, if P is true, [P] is 1, and if P is false, [P] is 0.

As described above, when newly labeled data, i.e., changed information, is created, the uncertainty-based model retrainer 180 may refine data about the problem situation interval (S240), and then may retrain the frame-level user behavior recognizer (S250).

On the other hand, if the corresponding uncertainty value is less than the first pre-configured threshold, that is, if the behavior classification result is determined to be certain, the uncertainty-based model retrainer 180 may check the behavior interval uncertainty value measured by the behavior interval uncertainty meter 160.

If the corresponding uncertainty value is greater than a pre-configured second threshold value (e.g., thr2), the uncertainty-based model retrainer 180 may determine that the result of the behavior interval is uncertain and generate data with a new label for the behavior interval (S220).

For example, the uncertainty-based model retrainer 180 may change the behavior interval information of the behavior instance detected by the multi-behavior detector 140 to generate newly labeled data.

In general, uncertainty ($u_t$) in the bahavior boundary frame may be high. Considering this, the uncertainty-based model retrainer 180 may change the start time and end time of the detected behavior instances to points with the greatest uncertainty in each vicinity.

When the detected behavior instance is $\{a_d, s_d, e_d\}$, the changed behavior recognition result $\overline{c}_t$ may be defined as Equation 4 below.

$$\overline{c}_t = \begin{bmatrix} \overline{c_{t1}} \\ \overline{c_{t2}} \\ \vdots \\ \overline{c_{tn}} \end{bmatrix}, \text{ for } s_d - \varepsilon \le t \le s_d + \varepsilon \text{ and } e_d - \varepsilon \le t \le e_d + \varepsilon, \qquad \text{[Equation 4]}$$

$$\overline{c_{ti}} = \begin{cases} 1 & \text{if } i = d \text{ and } \overline{s_d} \le t \le \overline{e_d} \\ 0 & \text{if } i = d \text{ and } (t < \overline{s_d} \text{ or } t > \overline{e_d}), \\ c_{ti} & \text{else} \end{cases}$$

$$\overline{s_d} = \underset{s_d - \varepsilon \le t \le s_d + \varepsilon}{\arg\max} u_t, \quad \overline{e_d} = \underset{e_d - \varepsilon \le t \le e_d + \varepsilon}{\arg\max} u_t$$

In Equation 4, $c_{ti}$ and $\overline{c_{ti}}$ represent the $i^{th}$ element values of $c_t$ and $\overline{c}_t$, respectively, and n represents the number of predefined behaviors. $\varepsilon$ represents the number of uncertainty values (e.g., positive integers) to be used before/after the start time and end time, and $\overline{s_d}$ and $\overline{e_d}$ represent the start time and end time of the changed behavior instance, respectively.

As described above, when newly labeled data, i.e., changed information, is created, the uncertainty-based model retrainer 180 may refine data about the problem situation interval (S240), and then may retrain the frame-level user behavior recognizer 130 (S250).

At this time, because retraining the model using data with incorrect behavior classification may have a greater impact on model performance than using data with incorrect behavior intervals, the uncertainty-based model retrainer 180 may be configured/defined to check the behavior classification uncertainty value before the behavior interval uncertainty value.

On the other hand, if the behavior interval uncertainty value is less than the pre-configured second threshold value, that is, if the behavior interval result is also determined to be certain, the uncertainty-based model retrainer 180 may generate labeled data using information about the corresponding behavior instance (S230).

For example, the uncertainty-based model retrainer 180 may generate newly labeled data using information on behavior instances detected by the multi-behavior detector 140. The uncertainty-based model retrainer 180 may change the value corresponding to the recognized behavior to the maximum value in the behavior recognition result ($c_t$) at each time point output within the interval of the detected behavior instance.

If the detected action instance is $\{a_d, s_d, e_d\}$, the changed behavior recognition result $\overline{c}_t$ may be defined as Equation 5 below.

$$\overline{c}_t = \begin{bmatrix} \overline{c_{t1}} \\ \overline{c_{t2}} \\ \vdots \\ \overline{c_{tn}} \end{bmatrix}, \text{ for } s_d \le t \le e_d, \qquad \text{[Equation 5]}$$

$$\overline{c_{ti}} = \begin{cases} 1 & \text{if } i = d \\ c_{ti} & \text{else} \end{cases},$$

In Equation 5, $c_{ti}$ and $\overline{c_{ti}}$ represent the ith element values of $c_t$ and $\overline{c}_t$, respectively, n represents the number of predefined behaviors.

As described above, when newly labeled data, i.e., changed information, is created, the uncertainty-based model retrainer 180 may refine data for the problem situation interval (S240) and may retrain the image feature extractor 120 (S260).

At this time, the fact that both the behavior classification and behavior interval are certain may mean that inference/calculation by the frame-level user behavior recognizer 130 is appropriate. Therefore, the uncertainty-based model retrainer 180 may retrain the corresponding model, that is, the image feature extractor 120 instead of the frame-level user behavior recognizer 130, this may have the technical effect of further improving overall performance.

Additionally or alternatively, the operation S240 of refining data for the problem situation interval in the above-described operations may be performed as shown in the following example.

Figure 6:
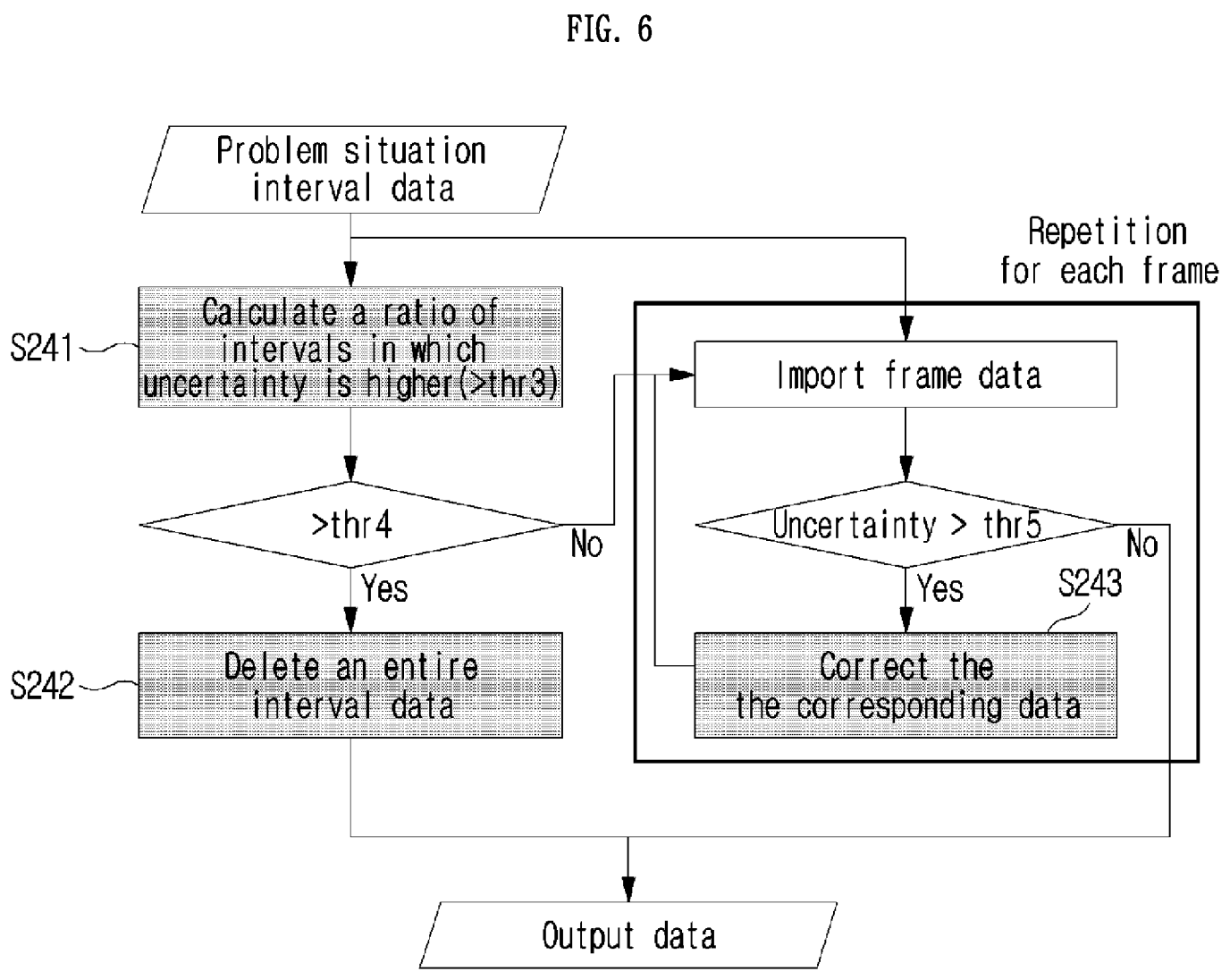

For example, the uncertainty-based model retrainer 180 may refine data on the problem situation interval detected by the problem situation detector 170 through the process shown in FIG. 6.

FIG. 6 illustrates a process of refining data for a problem situation interval according to an embodiment of the present disclosure.

Data to which the procedure in FIG. 6 is applied, i.e., data subject to refinement, may include data generated by newly labeling the behavior classification (S210), data generated by newly labeling the behavior interval (S220), and/or data generated by labeling the current detection result (S230).

That is, the data subject to refinement corresponds to the changed behavior recognition result ($\overline{c}_t$) delivered in steps S210, S220, and/or S230, the data that serves as the basis for refinement may be frame-level uncertainty ($u_t$) for the corresponding behavior recognition result.

The uncertainty-based model retrainer 180 may calculate the ratio of intervals in which uncertainty is higher than a pre-configured third threshold value (e.g., thr3) among data within the problem situation interval (S241).

For example, if the problem situation interval is $\{s_p, e_p\}$, the ratio of the interval with high uncertainty may be calculated as in Equation 6.

(the ratio of the interval with high uncertainty) = [Equation 6]

$$\sum\nolimits_{t=s_p}^{e_p} [u_t > thr3]/(e_p - s_p + 1)$$

If the calculated ratio is higher than the fourth pre-configured threshold (e.g., thr4), the uncertainty-based model retrainer 180 may determine that the reliability of the data of the entire interval is lowered due to problem situations (e.g., occlusion, shadows, camera noise, lighting changes, etc.), and may delete the entire interval data (S242). That is, in this case, data for the re-training step (e.g., step S250, step S260) may not be transmitted.

Additionally, as shown in FIG. 6, when the ratio of intervals with high uncertainty is low, that is, when the ratio calculated in step S241 is less than the fourth pre-configured threshold value, the uncertainty-based model retrainer 180 may repeatedly perform the process described later for each frame data within the problem situation interval.

If the uncertainty value of the corresponding frame data is less than or equal to the pre-configured fifth threshold (e.g., thr5), although there are problematic situations in the data, the recognition results are reliable, the data may be passed to step S250 or step S260 to be used for re-training.

On the other hand, if the uncertainty value of the corresponding frame data is greater than the pre-configured fifth threshold (e.g., thr5), the uncertainty-based model retrainer 180 may correct the data by using frame data with low uncertainty among data from surrounding timing (S243).

For example, if the problem situation interval is $\{s_p, e_p\}$ and the frame data at timing T needs to be refined, the uncertainty-based model retrainer 180 may correct the behavior recognition result ($\overline{c_T}$) as shown in Equation 7.

$$\widetilde{c_T} = (\overline{c_L} + \overline{c_R})/2, \qquad \text{[Equation 7]}$$

$$L = \underset{t_l \in \{t | t < T, \ u(t) < thr5\}}{\arg\min} (T - t_l),$$

$$R = \underset{t_r \in \{t | t > T, \ u(t) < thr5\}}{\arg\min} (t_r - T)$$

In Equation 7, $\widetilde{c_T}$ represents the corrected behavior recognition result, and $\overline{c_L}$ and $\overline{c_R}$ represent behavior recognition results with low uncertainty among data from the previous timing and subsequent timing, respectively.

Additionally or alternatively, the operation S250 of retraining the frame-level user behavior recognizer 130 in the above-described operations may be performed as in the following example.

For example, in order to retrain the frame-level user behavior recognizer 130, the uncertainty-based model retrainer 180 may use data that is newly labeled in step S210 and/or step S220 and refined in step S240.

The data used for re-training may refer to a pair of a user image, which is the model input, and a behavior recognition result ($\tilde{c}_t$), which is the model output, at each timing (t).

In this regard, the uncertainty-based model retrainer 180 back propagates the model error that occurs when newly labeled data is used as the ground truth input and output of the entire model, and may update the weights of the model. At this time, a fine-tuning method may be used in which the weights of the image feature extractor 120 are frozen and only the weights of the frame-level user behavior recognizer 130 are trained.

Additionally or alternatively, the operation S260 of retraining the image feature extractor 120 in the above-described operations may be performed as shown in the following example.

For example, in order to retrain the image feature extractor 120, the uncertainty-based model retrainer 180 may update the weights of the model by using the newly labeled data ($\tilde{c}_t$) in step S230 and refined in step S240 as the correct input/output of the entire model. At this time, a fine-tuning method may be used in which the weights of the frame-level user behavior recognizer 130 are frozen and only the weights of the image feature extractor 120 are trained.

FIG. 7 illustrates an operational flowchart for a method of performing model retraining according to an embodiment of the present disclosure.

The operation in FIG. 7 may correspond to the operation performed by the uncertainty recognition and retraining device 100 for user behavior detection described above in the present disclosure.

In step S710, based on user behavior information recognized in frames (e.g., output of a frame-level user behavior recognizer), one or more behavior instances consisting of the type of user behavior and the time interval of the user behavior may be detected (e.g., operation of multi-behavior detector 140).

In this regard, the one or more instances of behavior may be detected if the user behavior information remains greater than or equal to a threshold for the same behavior.

In step S720, for each detected behavior instance, at least one of a first uncertainty value for the type of user behavior or a second uncertainty value for the time interval of the user behavior may be calculated. (e.g., operation of the behavior classification uncertainty meter 150, operation of the behavior interval uncertainty meter 160).

In this regard, the second uncertainty value may be calculated when the first uncertainty value is smaller than or equal to a first threshold value pre-configured for the type of user behavior.

In step S730, based on a comparison between at least one of the first uncertainty value or the second uncertainty value and a pre-configured threshold, first data newly labeling the type of user behavior or second data newly labeling the time interval of the user behavior may be generated (e.g., operation of the uncertainty-based model retrainer 180).

In this regard, the first data may be generated and refined when the first uncertainty value is greater than a first threshold value pre-configured for the type of user behavior. Additionally, the second data may be generated and refined when the calculated second uncertainty value is greater than a second threshold value pre-configured for the time interval of the user behavior.

Additionally or alternatively, the refinement of the first data may be performed based on the ratio of the interval in which the first uncertainty value is greater than a certain value in the interval in which a situation that interferes with recognition of user behavior occurs. Similarly, refining of the second data may be performed based on the ratio of the interval in which the second uncertainty value is greater than a certain value in the section where a situation that interferes with recognition of user behavior occurs.

In step S740, the first data or second data generated as described above is refined, and a model that recognizes the user behavior information on a frame-by-frame basis may be trained (e.g., operation of the uncertainty-based model retrainer 180).

Additionally or alternatively, if the first uncertainty value is less than or equal to the first pre-configured threshold value and the second uncertainty value is less than or equal to the second pre-configured threshold value, newly labeled third data may be generated using information on the behavior instance (e.g., operation of the uncertainty-based model retrainer 180). Thereafter, the third data may be refined to train a model that extracts vector-type image features from real-time images (e.g., operation of the uncertainty-based model retrainer 180).

Here, the output information of the model that extracts the image features may be configured to be input to the model that recognizes the user behavior information on a frame-by-frame basis. Additionally or alternatively, only one of the weights of the model that extracts the image features and the weights of the model that recognizes the user behavior information on a frame-by-frame basis is trained, the other one may be set to freeze (e.g., fine-tuning).

Figure 8:
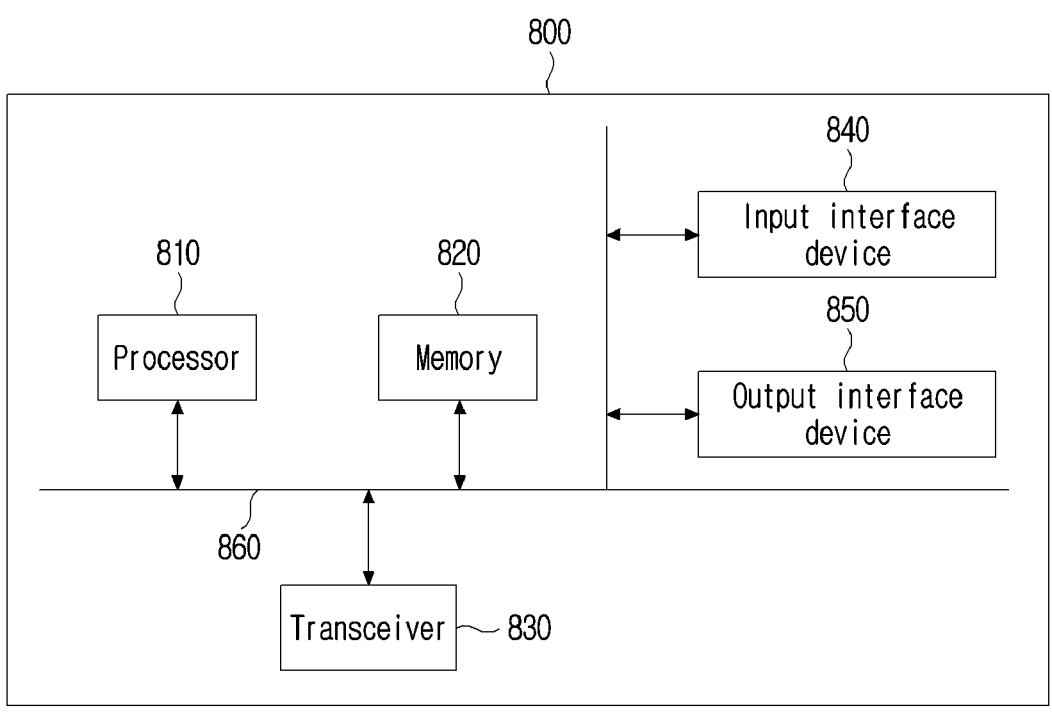
FIG. 8 is a block diagram illustrating a device according to an embodiment of the present disclosure.

FIG. 8 is a block diagram illustrating an apparatus according to an embodiment of the present disclosure.

Referring to FIG. 8, a device 800 may represent a device in which a method for (re) training a model related to user behavior detection described in the present disclosure is implemented.

For example, the device 800 may generally support/perform a function such as detecting behavior instances, a function to calculate uncertainty values for behavior types/intervals, a function to generate new labeled data through comparison with a threshold value, a function to refine data in the problem situation interval, a function to (re) train models based on refined data The device 800 may include at least one of a processor 810, a memory 820, a transceiver 830, an input interface device 840, and an output interface device 850. Each of the components may be connected by a common bus 860 to communicate with each other. In addition, each of the components may be connected through a separate interface or a separate bus centering on the processor 810 instead of the common bus 960.

The processor 810 may be implemented in various types such as an application processor (AP), a central processing unit (CPU), a graphic processing unit (GPU), etc., and may be any semiconductor device that executes a command stored in the memory 820. The processor 810 may execute a program command stored in the memory 820. The processor 810 may be configured to implement a method for (re) training a model related to user behavior detection based on FIGS. 1 to 7 described above.

And/or, the processor 810 may store a program command for implementing at least one function for the corresponding modules in the memory 820 and may control the operation described based on FIGS. 1 to 7 to be performed.

The memory 820 may include various types of volatile or non-volatile storage media. For example, the memory 820 may include read-only memory (ROM) and random access memory (RAM). In an embodiment of the present disclosure, the memory 820 may be located inside or outside the processor 810, and the memory 820 may be connected to the processor 810 through various known means.

The transceiver 830 may perform a function of transmitting and receiving data processed/to be processed by the processor 810 with an external device and/or an external system.

The input interface device 840 is configured to provide data to the processor 810.

The output interface device 850 is configured to output data from the processor 810.

According to the present disclosure, a method and apparatus may be provided for recognizing uncertainty in real-time user behavior detection and performing retraining of a model.

According to the present disclosure, in order to successfully perform real-time user behavior detection in a new environment, a method and apparatus for retraining a model by additionally collecting labeled data may be provided.

According to the present disclosure, there is a technical effect that may quickly secure a learning model optimized for a new environment and user at a low cost, be possible to and continuous performance improvement without user and/or expert intervention, and prevent data security issues and privacy infringement issues.

According to the present disclosure, since the proposed method is applicable not only to user behavior detection technology, but also to various technologies using data-based learning methods, there is a technical effect that may contribute to the spread of application of artificial intelligence technology.

The components described in the example embodiments may be implemented by hardware components including, for example, at least one digital signal processor (DSP), a processor, a controller, an application-specific integrated circuit (ASIC), a programmable logic element, such as an FPGA, GPU other electronic devices, or combinations thereof. At least some of the functions or the described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments s individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Accordingly, it is intended that this disclosure embrace all other substitutions, modifications and variations belong within the scope of the following claims.

What is claimed is:

1. A method for training a model related to user behavior detection, the method comprising:

detecting one or more behavior instances having a type of user behavior and a time interval of the user behavior, based on user behavior information recognized in frames;

calculating at least one of a first uncertainty value for the type of user behavior or a second uncertainty value for the time interval of the user behavior, for each detected behavior instance;

generating a first data newly labeling the type of user behavior or a second data newly labeling the time interval of the user behavior, based on a comparison between at least one of the first uncertainty value or the second uncertainty value and a pre-configured threshold; and training a model that recognizes the user behavior information on a frame-by-frame basis, by refining the first data or the second data.

2. The method of claim 1, wherein the first data is generated and refined when the first uncertainty value is greater than a first threshold value pre-configured for the type of user behavior.

3. The method of claim 2, wherein the second uncertainty value is calculated when the first uncertainty value is smaller than or equal to the first threshold value pre-configured for the type of user behavior.

4. The method of claim 3, wherein the second data is generated and refined when the calculated second uncertainty value is greater than a second threshold value pre-configured for the time interval of the user behavior.

5. The method of claim 4, the method further comprising:

generating a third data newly labeled using information on a behavior instance, when the first uncertainty value is less than or equal to the first pre-configured threshold value and the second uncertainty value is less than or equal to the second pre-configured threshold value; and training a model that extracts vector-type image features from real-time images, by refining the third data.

6. The method of claim 5, wherein output information of the model that extracts the image features is configured to be input to the model that recognizes the user behavior information on a frame-by-frame basis.

7. The method of claim 5, wherein only one of the weights of a model that extracts the image features and the weights of a model that recognizes the user behavior information on a frame-by-frame basis is trained, and the other one is set to freeze.

8. The method of claim 1, wherein a refinement of the first data is performed based on a ratio of the interval in which the first uncertainty value is greater than a certain value in an interval in which a situation that interferes with recognition of user behavior occurs, and wherein a refinement of the second data is performed based on a ratio of the interval in which the second uncertainty value is greater than a certain value in an interval in which a situation that interferes with recognition of user behavior occurs.

9. The method of claim 1, wherein the one or more behavior instances are detected when the user behavior information remains greater than or equal to a threshold for the same behavior.

10. An apparatus for training a model related to user behavior detection, the apparatus comprising:

a processor and a memory, wherein the processor is configured to:

detect one or more behavior instances having a type of user behavior and a time interval of the user behavior, based on user behavior information recognized in frames;

calculate at least one of a first uncertainty value for the type of user behavior or a second uncertainty value for the time interval of the user behavior, for each detected behavior instance;

generate a first data newly labeling the type of user behavior or a second data newly labeling the time interval of the user behavior, based on a comparison between at least one of the first uncertainty value or the second uncertainty value and a pre-configured threshold; and train a model that recognizes the user behavior information on a frame-by-frame basis, by refining the first data or the second data.

11. The apparatus of claim 10, wherein the first data is generated and refined when the first uncertainty value is greater than a first threshold value pre-configured for the type of user behavior.

12. The apparatus of claim 11, wherein the second uncertainty value is calculated when the first uncertainty value is smaller than or equal to the first threshold value pre-configured for the type of user behavior.

13. The apparatus of claim 12, wherein the second data is generated and refined when the calculated second uncertainty value is greater than a second threshold value pre-configured for the time interval of the user behavior.

14. The apparatus of claim 13, wherein the processor is configured to:

generate a third data newly labeled using information on a behavior instance, when the first uncertainty value is less than or equal to the first pre-configured threshold value and the second uncertainty value is less than or equal to the second pre-configured threshold value; and train a model that extracts vector-type image features from real-time images, by refining the third data.

15. The apparatus of claim 14, wherein output information of the model that extracts the image features is configured to be input to the model that recognizes the user behavior information on a frame-by-frame basis.

16. The apparatus of claim 14, wherein only one of the weights of a model that extracts the image features and the weights of a model that recognizes the user behavior information on a frame-by-frame basis is trained, and the other one is set to freeze.

17. The apparatus of claim 10, wherein a refinement of the first data is performed based on a ratio of the interval in which the first uncertainty value is greater than a certain value in an interval in which a situation that interferes with recognition of user behavior occurs, and wherein a refinement of the second data is performed based on a ratio of the interval in which the second uncertainty value is greater than a certain value in an interval in which a situation that interferes with recognition of user behavior occurs.

18. The apparatus of claim 10, wherein the one or more behavior instances are detected when the user behavior information remains greater than or equal to a threshold for the same behavior.

19. One or more non-transitory computer readable medium storing one or more instructions, wherein the one or more instructions are executed by one or more processors and control an apparatus for training a model related to user behavior detection to:

detect one or more behavior instances having a type of user behavior and a time interval of the user behavior, based on user behavior information recognized in frames;

calculate at least one of a first uncertainty value for the type of user behavior or a second uncertainty value for the time interval of the user behavior, for each detected behavior instance;

generate a first data newly labeling the type of user behavior or a second data newly labeling the time interval of the user behavior, based on a comparison between at least one of the first uncertainty value or the second uncertainty value and a pre-configured threshold; and train a model that recognizes the user behavior information on a frame-by-frame basis, by refining the first data or the second data.

20. The computer readable medium of claim 19, wherein the second uncertainty value is calculated when the first uncertainty value is smaller than or equal to the first threshold value pre-configured for the type of user behavior.

* * * * *